(12) United States Patent
Brehmer et al.

(10) Patent No.: US 10,766,395 B2
(45) Date of Patent: Sep. 8, 2020

(54) BOAT GUIDE

(71) Applicant: Brehmer Manufacturing, Inc., Lyons, NE (US)

(72) Inventors: Jamie C. Brehmer, Lyons, NE (US); Joey R. Brehmer, Lyons, NE (US)

(73) Assignee: BREHMER MANUFACTURING, INC., Lyons, NE (US)

( * ) Notice: Subject to any disclaimer, the term of this patent is extended or adjusted under 35 U.S.C. 154(b) by 0 days.

(21) Appl. No.: 15/714,288

(22) Filed: Sep. 25, 2017

(65) Prior Publication Data

US 2019/0092211 A1 Mar. 28, 2019

(51) Int. Cl.
*B60P 3/10* (2006.01)
*B63B 59/02* (2006.01)
*B63C 1/02* (2006.01)
*B63C 1/10* (2006.01)

(52) U.S. Cl.
CPC .......... *B60P 3/1075* (2013.01); *B63B 59/02* (2013.01); *B63C 1/02* (2013.01); *B63C 1/10* (2013.01); *B60P 3/1033* (2013.01)

(58) Field of Classification Search
CPC ............ B60P 3/1075; B63B 9/02; B63C 1/02
USPC ............... 280/414.1; 114/263, 292; 414/532
See application file for complete search history.

(56) References Cited

U.S. PATENT DOCUMENTS

| | | | |
|---|---|---|---|
| 3,412,702 A * | 11/1968 | Mann | B63C 1/06 114/46 |
| 3,608,754 A | 9/1971 | Park | |
| 3,763,587 A | 10/1973 | Firmalino | |
| 4,050,398 A | 9/1977 | Holliday et al. | |
| 4,395,185 A | 7/1983 | Whaley | |
| 4,623,161 A | 11/1986 | Sprague | |
| 4,679,517 A | 7/1987 | Kramer et al. | |
| 4,708,081 A | 11/1987 | Amirikian et al. | |
| 4,804,296 A | 2/1989 | Smath et al. | |
| 4,858,943 A | 8/1989 | Cote | |
| 5,013,206 A | 5/1991 | Ernst et al. | |
| 5,113,702 A | 5/1992 | Capps et al. | |
| 5,228,713 A | 7/1993 | Kovach | |
| 5,320,057 A | 6/1994 | Dourlain et al. | |
| 5,332,249 A | 7/1994 | Solberg et al. | |
| 5,441,007 A | 8/1995 | Hunt | |
| 5,544,611 A | 8/1996 | Fahringer et al. | |
| 5,826,528 A * | 10/1998 | Jancsek | B63C 1/02 114/45 |
| 5,911,189 A | 6/1999 | Ryan et al. | |
| 6,575,110 B1 * | 6/2003 | Nelson | B63C 1/10 114/219 |

(Continued)

*Primary Examiner* — Jacob D Knutson
*Assistant Examiner* — Felicia L. Brittman
(74) *Attorney, Agent, or Firm* — Perkins Coie LLP (57) ABSTRACT

A boat guide is coupled with a boat support and includes one or more float assemblies. The float assemblies are coupled with the boat support such that forward and rearward ends of the float assemblies are movable between lower and upper positions with respect to the boat support. The float assemblies are independently moveable with respect to the boat support. One or more boat guides may be positioned at the entrance of the boat support to help orient the vessel as it enters the boat support. A boat stop may be positioned at the end of the boat support to position the vessel along a length of the boat support. The boat guide is easily adapted for use with docks, slips, boat lifts, and trailers.

14 Claims, 9 Drawing Sheets

(56) References Cited

U.S. PATENT DOCUMENTS

| | | |
|---|---|---|
| 6,616,166 B2 | 9/2003 | Marchese |
| 6,648,360 B1 | 11/2003 | Dray et al. |
| 7,267,071 B2 | 9/2007 | Brown |
| 7,455,310 B2 | 11/2008 | Hyslop |
| 8,006,995 B2 | 8/2011 | Caudill |
| 8,534,212 B1 | 9/2013 | Worsley et al. |
| 10,232,760 B2 | 3/2019 | Leasure |
| 2003/0137124 A1 | 7/2003 | Marchese et al. |
| 2017/0341561 A1* | 11/2017 | Hess .................... B60P 3/1075 |

* cited by examiner

BOAT GUIDE

BACKGROUND

Docking a marine vessel in rough conditions can be challenging even for experienced operators. Pontoon-type vessels are especially susceptible to the effects of wind and current, which can cause the vessel to drift sideways as it slows down or stops. These types of vessels are also not well adapted to making tight turns, which creates an additional challenge when entering a narrow dock or slip. Such operating conditions often present risks for potentially expensive damage to the vessel, dock, or boat lift. Individuals assisting with the docking process also risk injury. These types of injuries are often due to an appendage, especially fingers or hands, being caught between the rails of the vessel and the edges of the slip. Individuals attempting to stabilize the vessel during docking also risk being knocked or pulled from the dock as the vessel sways back and forth inside the slip.

Most of the technology currently used to mitigate these issues focuses on guiding the vessel into the docking area. However, the technology oftentimes does not provide adequate stabilization against the effects of wind forces or current action during the entire docking process. In most cases, these guidance mechanisms are in a fixed position, independent of the vessel, and require a greater level of skill from the operator to ensure that the vessel properly contacts the guidance mechanism. Moreover, such technology is not easily adaptable for use with different types of boat supports, such as docks, slips, boat lifts, and boat trailers. Examples of prior technology include: gates or bumpers attached at the entry point of the slip; guide lines positioned within the slip; and rollers attached to the edges of the slip.

What is needed is a guide system for a boat support that provides enhanced stability, reduces the risk of damage to property and provides a greater degree of safety for individuals around the docking area. Such a system should also be capable of operating on several different types of boat supports, such as various docks, slips, boat lifts, and trailers.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

Guide systems and methods of use are presented for use with boat supports, having a support frame. Embodiments of the guide system include first and second float assemblies, each having forward and rearward end portions. The first float assembly and second float assembly are operatively coupled with the support frame and movable between a lower position adjacent the support frame and an upper position, where the forward end portions and rearward end portions of the first and second float assemblies are positioned above, and spaced apart from, the support frame.

In particular embodiments, the first and second float assemblies are coupled to the support frame with linkage arms that allow the forward and rearward end portions of the first and second float assemblies to incrementally adjust through an infinite number of positions between the lower and upper positions. In some embodiments, the linkage arms allow the first and second float assemblies to move independently from one another. The first and second float assemblies are positioned so that they will engage the inner surface of the pontoons of a pontoon-type marine vessel as it enters the boat support. The linkage arms allow the float assemblies to automatically adjust up or down according to the varying wave heights as the vessel enters the boat support to ensure continuous contact between the first and second float assemblies and the vessel.

In particular embodiments, one or more guide panels may be coupled with an entrance end of the boat support. As the vessel enters the boat support, the forward end of the vessel contacts at least one of the guide panels. The guide panels aid in the initial alignment of the vessel as it enters the boat support. A boat stop at the end of the boat support can be used to stop forward movement of the vessel. The enhanced stability provided by the combination of the first and second float assemblies and the boat stop reduces the risk of damage to the vessel or dock, and assists to mitigate possible injury to individuals assisting with docking the vessel.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 9:
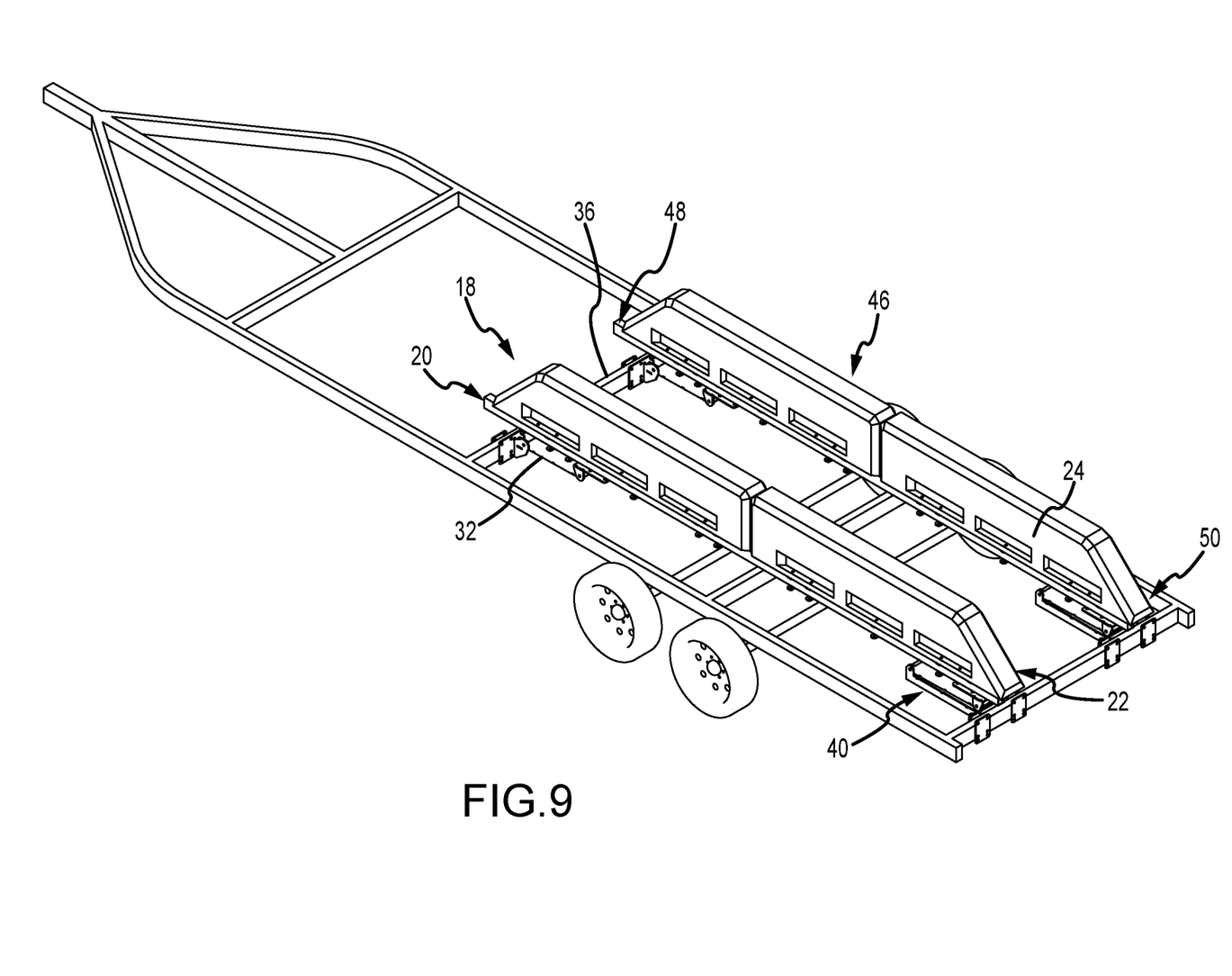
FIG. 9 depicts a perspective view of one embodiment of a boat guide of the present technology and one manner in which the boat guide may be operatively coupled with a boat trailer.
Figure 10:
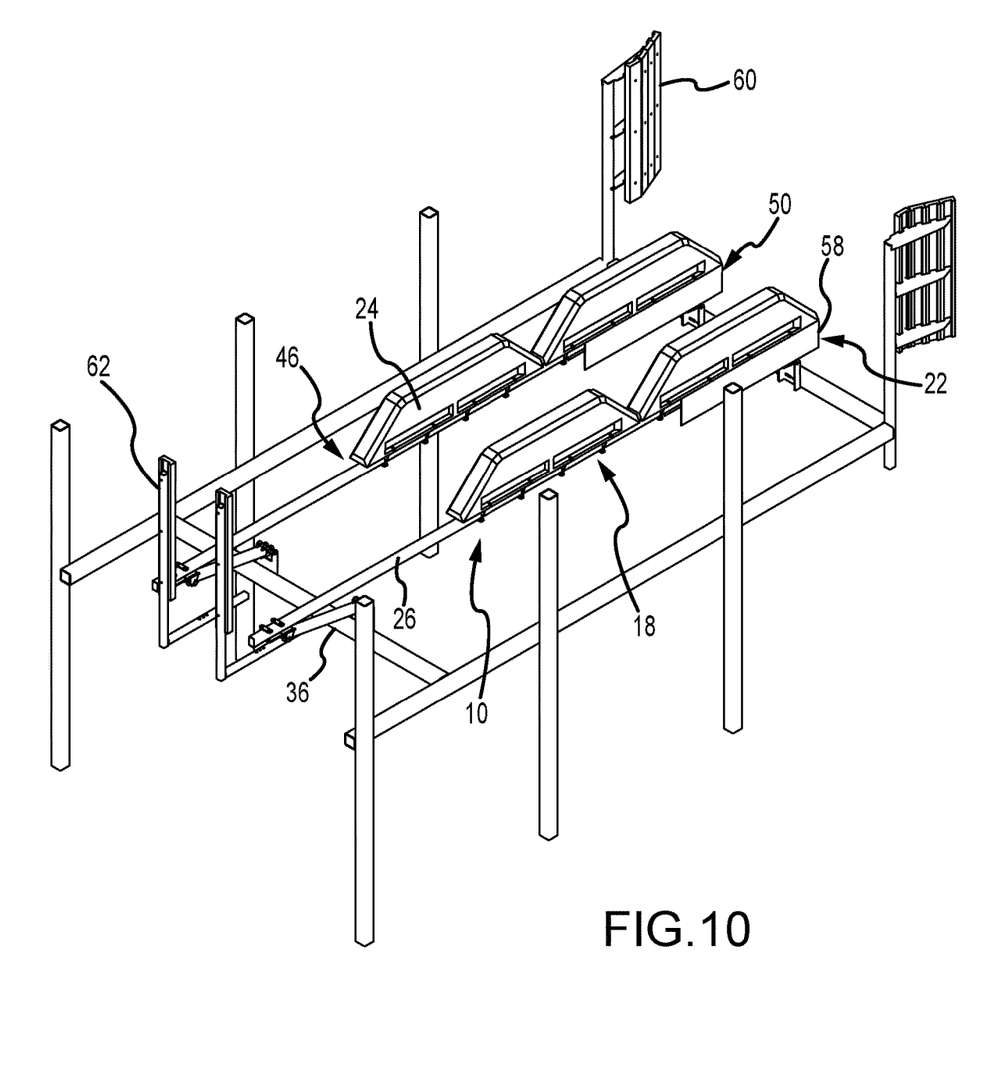
FIG. 10 depicts a perspective view of one embodiment of a boat guide of the present technology and one manner in which the boat guide may be operatively coupled with a post frame structure of a dock.

With reference to FIGS. 1-10, embodiments of a boat guide are depicted according to aspects of the present technology. The boat guide 10 is adaptable for use with a wide array of boat supports including, but not limited to, docks, slips (FIGS. 1-4), boat lifts and boat trailers (FIG. 9). In some embodiments, the boat support may simply consist of a plurality of posts (FIG. 10) or other structures secured in a position that can support, store, or transport a marine vessel. The boat support will, in any case, include a support frame to which the boat guide may be secured.

FIGS. 1-4 show embodiments of the boat guide 10 as it can be used with a pontoon boat 12, having a pair of elongate pontoons 14 and 16 along sides of the pontoon boat 12. However, it will be apparent from the description of the various embodiments below that the boat guide 10 can also be used with other marine vessels, such as tri-toon boats, multi-hulled, and single-hulled marine vessels.

Figure 5:
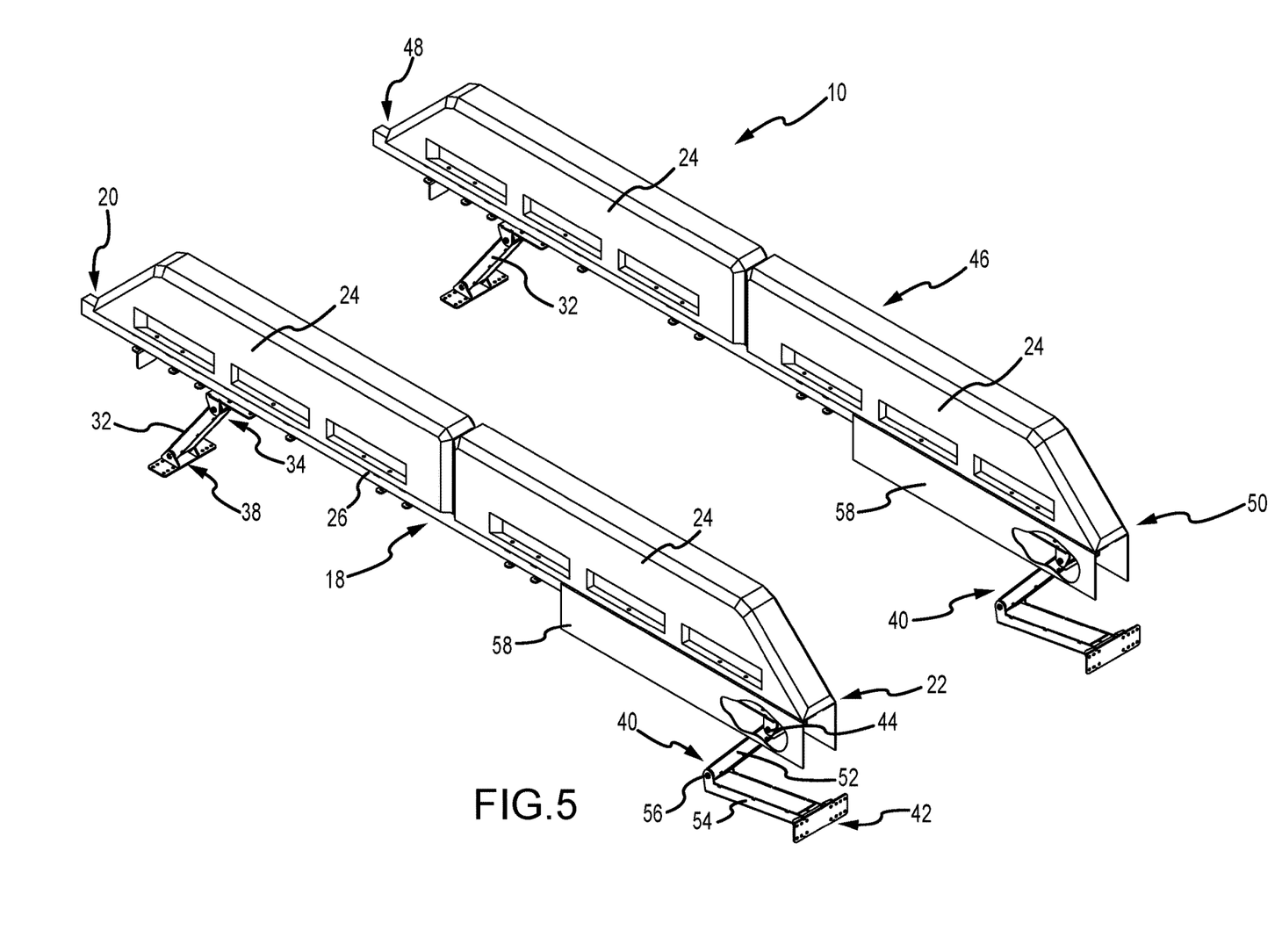
FIG. 5 depicts an upper perspective view of one embodiment of a pair of float assemblies that can be used with the boat guide of the present technology.
Figure 6:
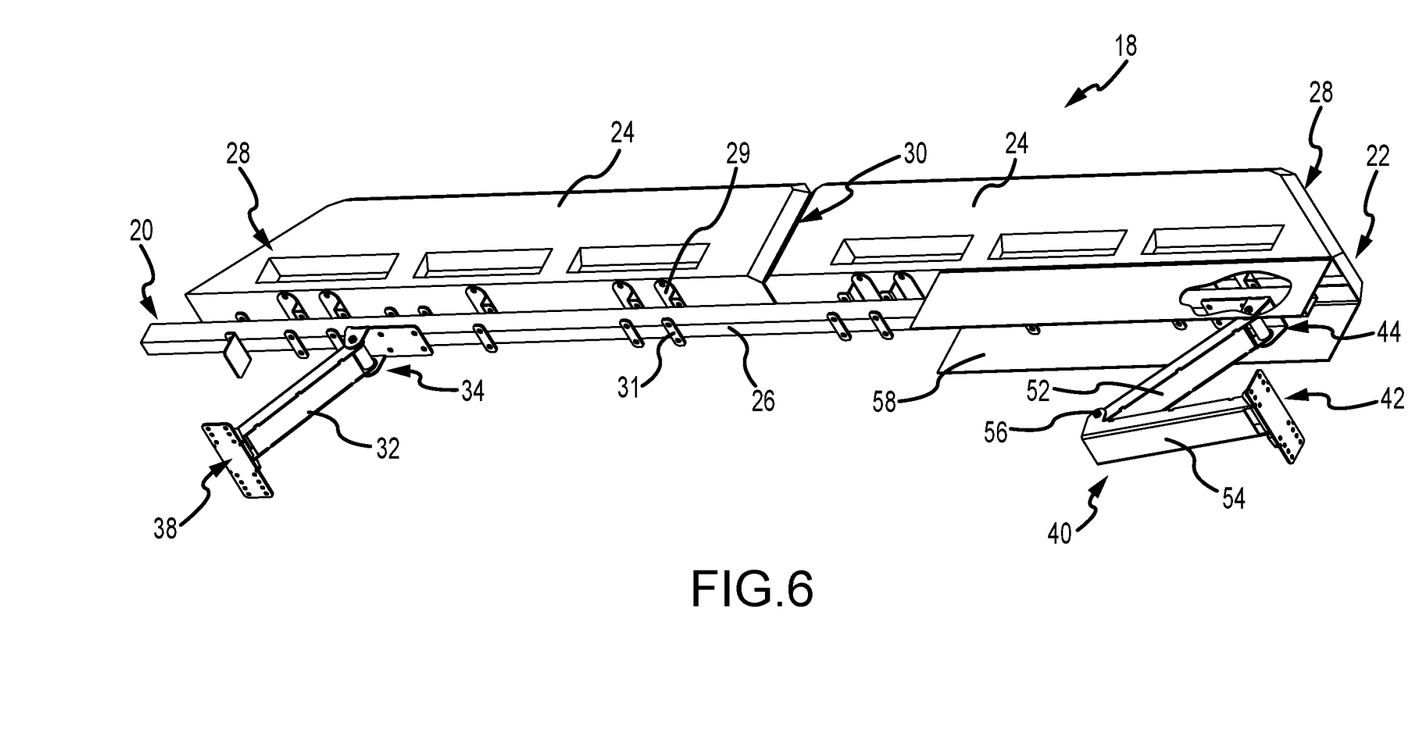
FIG. 6 depicts a lower perspective view of one of the float assemblies of FIG. 3.
Figure 7:
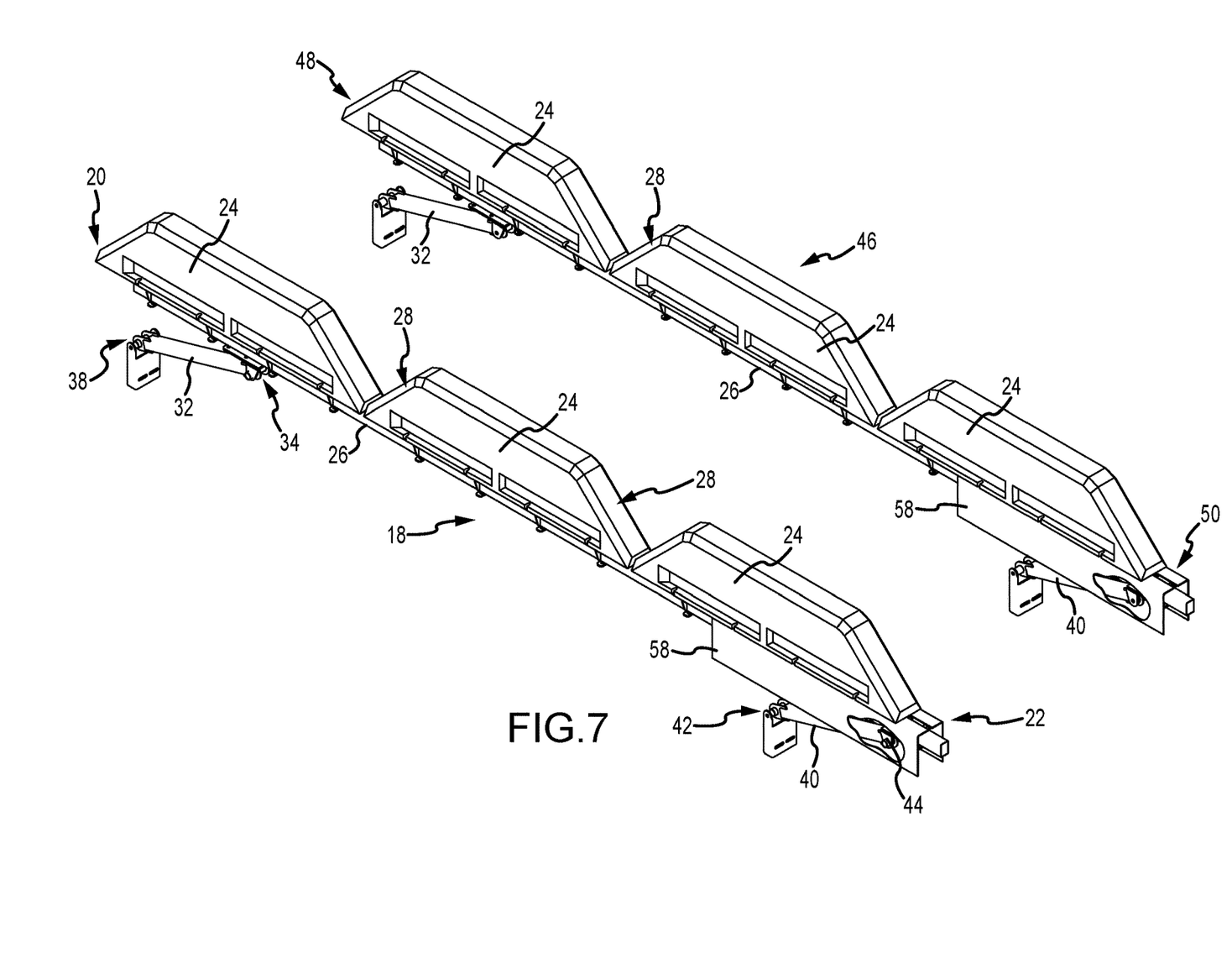
FIG. 7 depicts an upper perspective view of another embodiment of a pair of float assemblies that can be used with the boat guide of the present technology.
Figure 8:
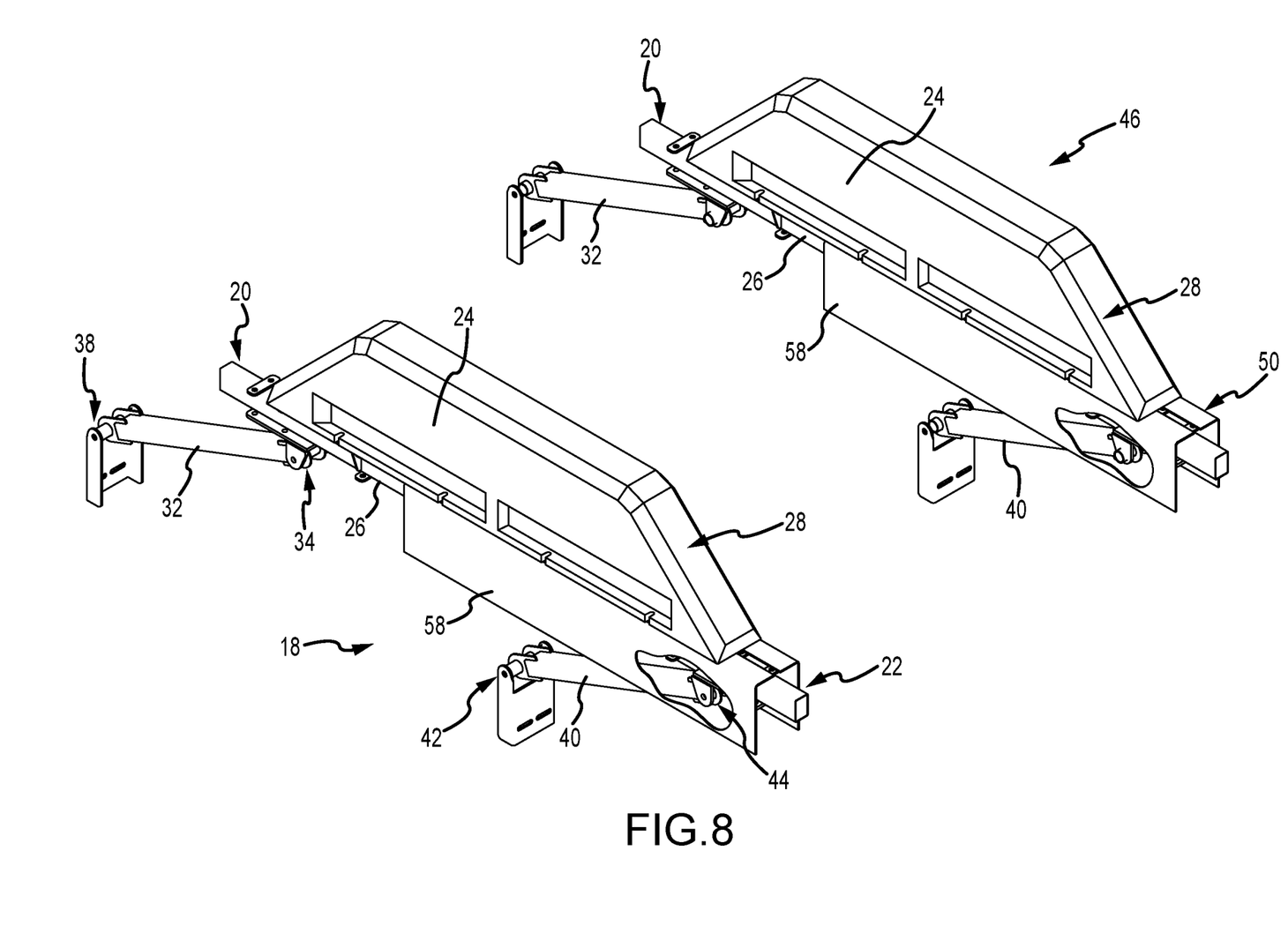
FIG. 8 depicts an upper perspective view of still another embodiment of a pair of float assemblies that can be used with the boat guide of the present technology.

The boat guide 10 will include at least one float assembly 18 having a forward end portion 20 and a rearward end portion 22. The float assembly 18 includes at least one elongated float 24 coupled with a rigid lower beam 26. The float is formed from a durable material that is buoyant in water. In particular embodiments, the float is comprised of a material that is unlikely to mar surfaces of marine vessels, such as various natural and synthetic rubbers, open or closed-cell foams, and polymers. The floats 24 may be permanently or removably secured to the lower beam 26. In one embodiment, a plurality of mounting brackets 29 and washers 31 fasten with one another to secure the float 24 with the lower beam 26; however, other clamps and fasteners are contemplated. With reference to FIGS. 5-7, embodiments of the float assembly 18 include a plurality of separate floats 24 secured adjacent one another along a length of the lower beam 26. By providing a plurality of floats 24, having relatively shorter lengths, the design of the system can accommodate various lengths of marine vessels and help to maintain a parallel relationship between the full length of the vessel and the water line.

Figure 1:
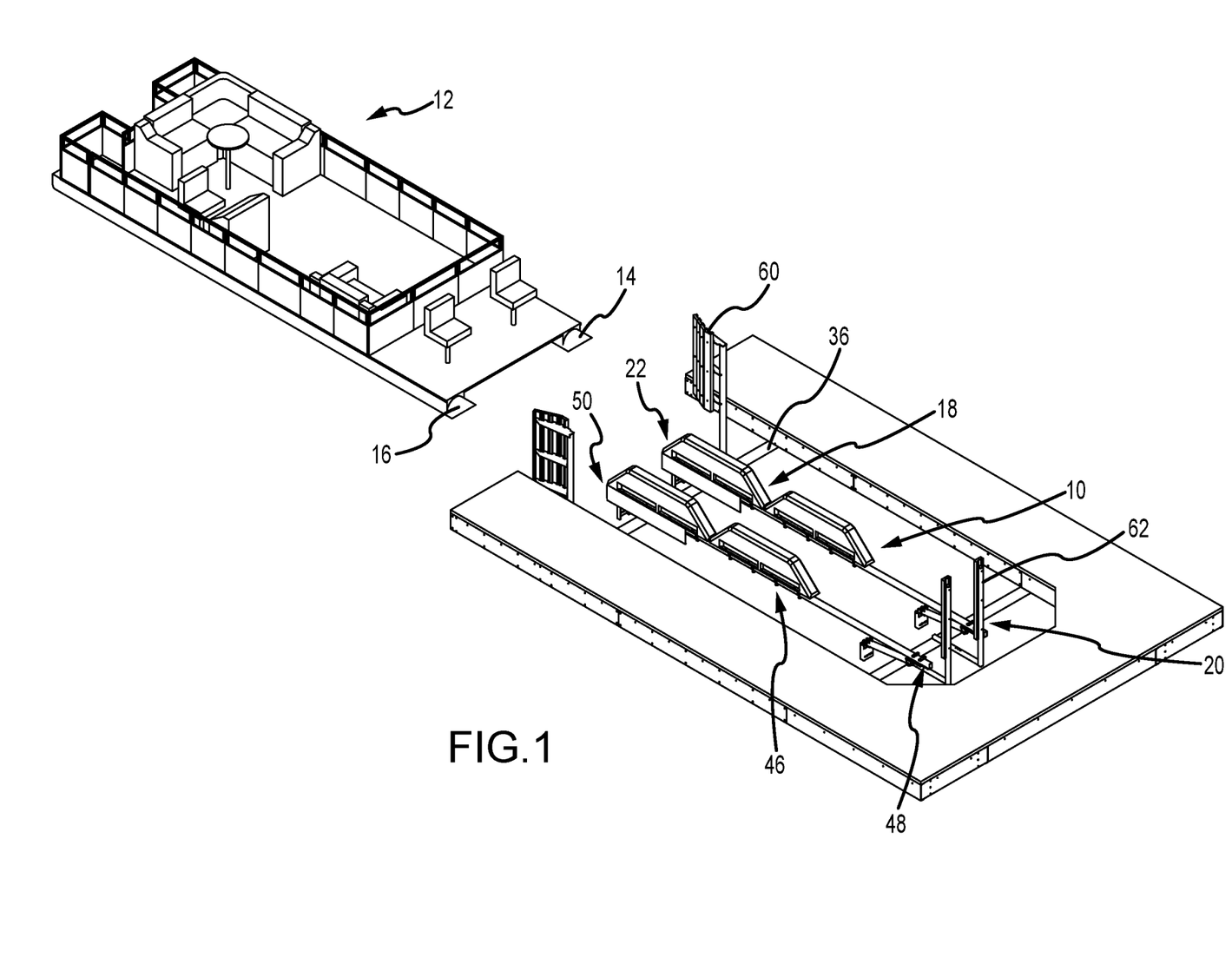
FIG. 1 depicts a perspective view of one embodiment of a boat guide of the present technology and further depicts a pontoon-type marine vessel that can be used with the boat guide.
Figure 2:
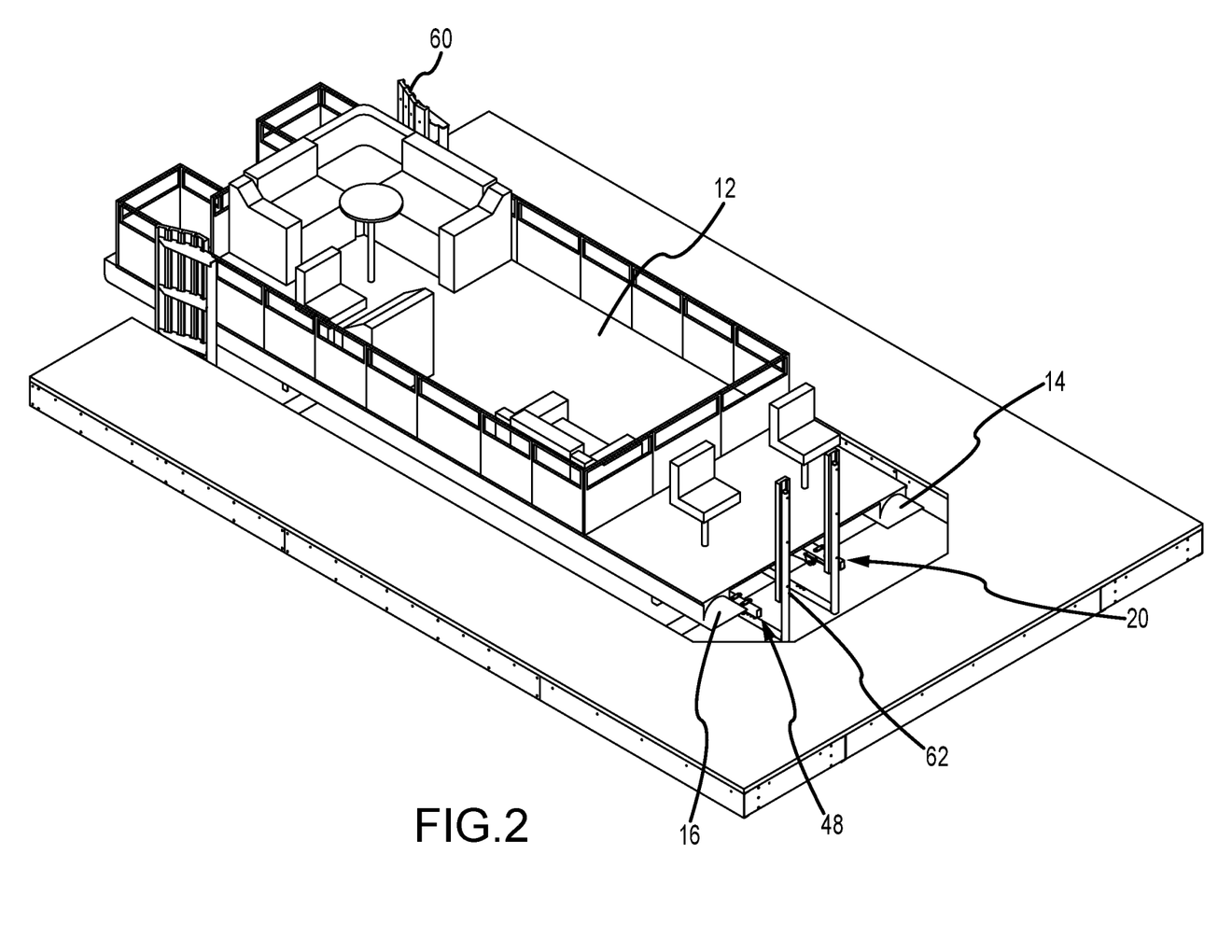
FIG. 2 depicts one manner in which the boat guide and pontoon-type marine vessel of FIG. 1 may be engaged with one another in a docked position within a slip.
Figure 3:
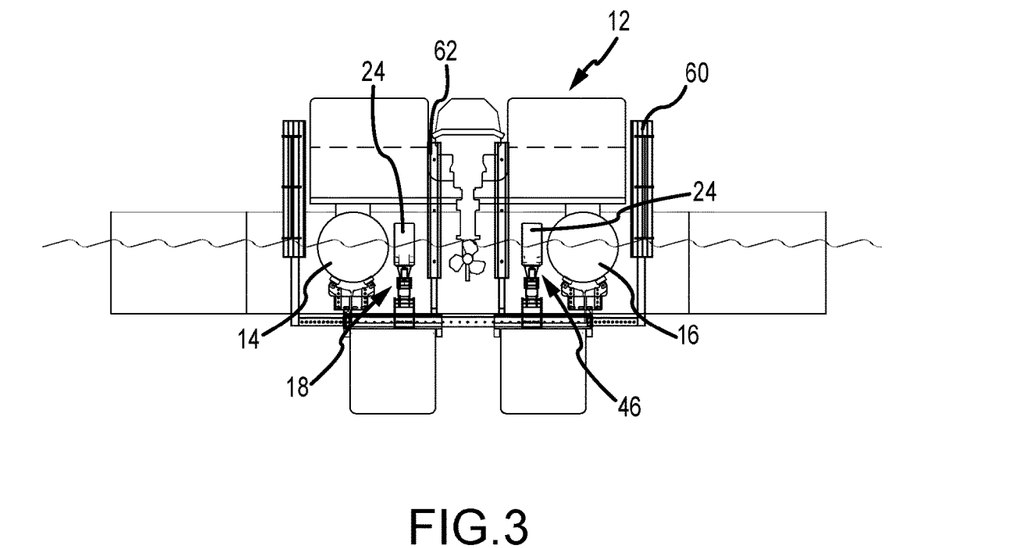
FIG. 3 depicts a rear elevation view of the boat guide and pontoon-type marine vessel of FIG. 2 in the docked position.
Figure 4:
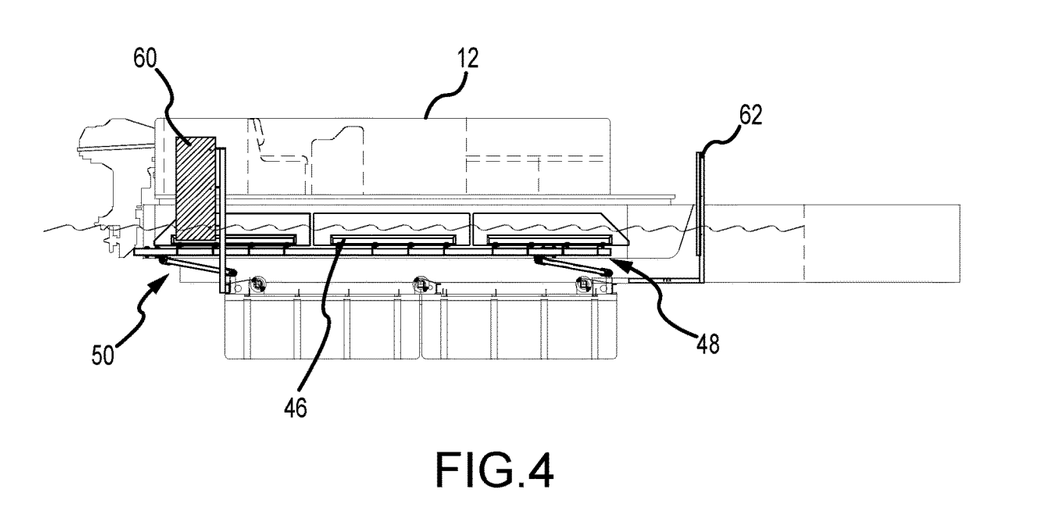
FIG. 4 depicts a side elevation view of the boat guide and pontoon-type marine vessel of FIG. 2 in the docked position.

Embodiments of the floats 24 are shaped to be elongate and tall, with a relatively narrow width. In a particular embodiment, the float 24 has a length of approximately 80 inches, a height of 16 inches, and a width of approximately 8 inches. With reference to FIGS. 3 and 4, floats 24 are dimensioned such that a portion of the float 24 extends above the surface of the water. The floats may be provided with tapered ends 28 that angle downwardly from an upper end portion to a lower end portion of the float 24. The tapered ends 28 adjacent the allow vessels to enter the boat guide 10 at sharper approach angles. In some embodiments, adjacent end portions of floats 24 have vertical ends 30 to abut one another, such as in FIGS. 5 and 6. In other embodiments, adjacent end portions of floats 24 may be tapered ends 28, such as in FIG. 7.

With continued reference to FIGS. 5-8, various embodiments of the float assembly 18 include a first linkage 32 having a first end portion 34 operatively, pivotably coupled with the support frame 36 and a second end portion 38 operatively, pivotably coupled with the forward end portion 20 of the float assembly 18, such that the first linkage 32 may articulate between lower and upper positions. In some embodiments, float assembly 18 includes a second linkage 40, having a first end portion 42 operatively, pivotably coupled with the support frame 36 and a second end portion 44 operatively, pivotably coupled with the rearward end 22 of the float assembly 18, such that the second linkage 40 may articulate between lower and upper positions. In such embodiments, the forward end portion 20 and rearward end portion 22 of the float assembly 18 are positioned adjacent the support frame 36 when the first linkage 32 and second linkage 40 are in the lower position and the forward end portion 20 and rearward end portion 22 of the float assembly 18 are positioned above and spaced apart from the support frame 36 when the first linkage 32 and second linkage 40 are in the upper position.

In various embodiments, the boat guide 10 includes a second float assembly 46, having a forward end portion 48 and a rearward end portion 50. The second float assembly will typically be configured to be identical to the first float assembly 18. However, depending on the application and intended use, variations are contemplated. Likewise, the second float assembly may be coupled with the support frame 36 in a manner similar to that described above with regard to the first float assembly 18. In particular embodiments, the second float assembly includes a first linkage 32 and second linkage 40, which function as described above. Where two float assemblies are used, it is contemplated that the manner in which they are coupled with the support frame will permit the float assemblies to move between the lower and upper positions independently from one another.

With regard to FIG. 9, it is contemplated that the boat guide 10 may be used with a boat trailer. Marine vessels are typically launched and recovered from boat trailers on an incline. However, it will be desirable to have the first float assembly 18 and second float assembly 46 horizontally disposed, or as close as possible thereto, so that a majority of the lengths of the first float assembly 18 and second float assembly 46 are exposed above the surface of the water. Accordingly, in such embodiments, the rearward end portions 22 and 50 of the first float assembly 18 and second float assembly 46 will need to extend further away from the support frame 36 of the boat trailer than the forward end portions 20 and 48. In such embodiments, the second linkage 40 of each of the first float assembly 18 and second float assembly 46 each includes an upper arm 52 and lower arm 54 that are coupled with one another at an articulating joint 56 intermediate the first and second end portions 42 and 44 of the second linkages 40. This allows a distance between the first and second end portions 42 and 44 to change as the upper and lower arms 52 and 54 pivot with respect to one another at the articulating joint 56. In such embodiments, the second linkages 40 of the first float assembly 18 and second float assembly 46 are longer than the first linkage 32 of the first float assembly 18 and second float assembly 46, such that the rearward end portions 22 and 50 of the first float assembly 18 and second float assembly 46 are spaced further away from the support frame 36 than the forward end portions 20 and 48 of the first float assembly 18 and second float assembly 46 when the first linkages 32 and second linkages 40 are in the upper position. The adjustable length of the second linkages 40 allow for the boat trailer to be positioned on different boat launches, each disposed at different angles.

Regardless of the manner in which the second linkage 40 of the first float assembly 18 and second float assembly 46 is configured, a shroud 58 may be provided to extend downwardly from the rigid lower beam 26, past the connecting point between the second linkage and the float assembly. In this manner, the shroud 58 partially protects the second linkage 40, and in particular, the pivoting connection between the second linkage 40 and the float assembly, from incidental contact from portions of a marine vessel as it comes into contact with the rearward end portions of the float assembly.

Where the boat guide 10 includes both a first float assembly 18 and second float assembly 46, they will be positioned to be generally parallel with one another. It is contemplated that the boat guide 10 will be used with pontoon boats. In such situations, and with reference to FIG. 3, the first float assembly 18 and second float assembly 46 are adjacent but between the pontoons 14 and 16 of the pontoon boat 12 when the pontoon boat 12 is secured on the boat support. In this manner, the first float assembly 18 and second float assembly 46 straddle but are spaced away from a centerline running the length of the boat support.

In various embodiments, the first float assembly 18 and second float assembly 46 are positioned so that rearward end portions 22 and 50 of the first float assembly 18 and second float assembly 46 engage inner surfaces of the pontoons of a pontoon boat 12 as it enters the boat support. The first and second linkages 32 and 40 allow the first float assembly 18 and second float assembly 46 to automatically adjust up or down according to the varying wave heights as the pontoon boat 12 enters the boat support to ensure continuous contact between the first and second float assemblies 18 and 46 and the pontoon boat 12. In particular embodiments, the first float assembly 18 and second float assembly 46 extend along a substantial portion of the length of the boat support. In this manner, the pontoons have guidance along the length of the boat support to compensate for cross currents, breezes, or inaccurate approach angles. In other embodiments, a single float assembly can be used. In such embodiments, the float assembly is positioned between one side of the boat support and a centerline of the boat support so that it will be adjacent one of the pontoons 14 or 16 of the pontoon boat 12 when the pontoon boat 12 is secured on the boat support.

With reference to FIGS. 1-4, and 10, one or more guide panels 60 may be coupled with an entrance end of the boat support, on the sides of the boat support, so that the rearward end portions 22 and 50 of the first float assembly 18 and second float assembly 46 are positioned between and adjacent the guide panels 60 along a width of the boat support. In particular embodiments, the guide panels 60 have a slightly curved profile and are formed from a deformably resilient material. In this manner, a marine vessel entering the boat support entrance at an angle may engage a guide panel 60 and be initially redirected into the guide support where the first float assembly 18 and second float assembly 46 can finish aligning the boat as it pulls further into the boat support.

In some embodiments, a boat stop 62 may be positioned at the end of the boat support to inhibit forward travel of the marine vessel through the boat support. With reference to FIGS. 1-4 and 10, an exemplary embodiment of the boat stop 62 is provided in the form of a pair of rigid uprights extending from the boat support. The rigid uprights include bumpers formed from a resiliently deformable material that cushions against moderate engagement with the marine vessel without marring the exterior of the marine vessel. The boat stop 62 may be provided in a variety of other shapes and configurations depending upon the orientation of the boat support and the shape of marine vessel being supported.

Although the technology has been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A guide system for a boat support, having a support frame, the guide system comprising:
    a float assembly having a forward end portion and a rearward end portion;
        a first linkage having a first end portion operatively, pivotably coupled with the support frame and a second end portion operatively, pivotably coupled with the forward end portion of the float assembly, such that the first linkage may articulate between lower and upper positions;
        a second linkage having a first end portion operatively, pivotably coupled with the support frame and a second end portion operatively, pivotably coupled with the rearward end of the float assembly, such that the second linkage may articulate between lower and upper positions;
        wherein the forward end portion and rearward end portion of the float assembly are positioned adjacent the support frame when the first linkage and second linkage are in the lower position and the forward end portion and rearward end portion of the float assembly are positioned above and spaced apart from the support frame when the first linkage and second linkage are in the upper position; and
    a second float assembly having a forward end portion and a rearward end portion;
        a first linkage having a first end portion operatively, pivotably coupled with the support frame and a second end portion operatively, pivotably coupled with the forward end portion of the second float assembly, such that the first linkage may articulate between lower and upper positions;
        a second linkage having a first end portion operatively, pivotably coupled with the support frame and a second end portion operatively, pivotably coupled with the rearward end of the second float assembly, such that the second linkage may articulate between lower and upper positions;

wherein the forward end portion and rearward end portion of the second float assembly are positioned adjacent the support frame when the first linkage and second linkage are in the lower position and the forward end portion and rearward end portion of the second float assembly are positioned above and spaced apart from the support frame when the first linkage and second linkage are in the upper position;

the float assembly and second float assembly being laterally spaced from one another across a width of the support frame;

the float assembly and second float assembly articulate on their respective first linkage and second linkage independently from one another.

2. The guide system of claim 1 wherein:

the float assembly and second float assembly are elongated in shape and lengths of the float assembly and second float assembly extend generally parallel with one another.

3. The guide system of claim 1 wherein:

the float assembly and second float assembly are each comprised of at least one elongated float coupled with a rigid lower beam.

4. The guide system of claim 1 wherein:

the second linkage of the float assembly and second float assembly each includes an upper arm and lower arm that are coupled with one another at an articulating joint intermediate the first and second end portions of the second linkages that allows a distance between the first and second end portions to change as the upper and lower arms pivot with respect to one another at the articulating joint.

5. The system of claim 1 further comprising:

a boat stop assembly operatively coupled with, and extending upwardly from, a forward end of the support frame; the boat stop assembly being positioned and configured to inhibit passage of a boat through the forward end of the support frame.

6. A guide system for a boat support, having a support frame, the guide system comprising:

a float assembly having a forward end portion and a rearward end portion;

a first linkage having a first end portion operatively, pivotably coupled with the support frame and a second end portion operatively, pivotably coupled with the forward end portion of the float assembly, such that the first linkage may articulate between lower and upper positions;

a second linkage having a first end portion operatively, pivotably coupled with the support frame and a second end portion operatively, pivotably coupled with the rearward end of the float assembly, such that the second linkage may articulate between lower and upper positions;

wherein the forward end portion and rearward end portion of the float assembly are positioned adjacent the support frame when the first linkage and second linkage are in the lower position and the forward end portion and rearward end portion of the float assembly are positioned above and spaced apart from the support frame when the first linkage and second linkage are in the upper position; and a second float assembly having a forward end portion and a rearward end portion;

a first linkage having a first end portion operatively, pivotably coupled with the support frame and a second end portion operatively, pivotably coupled with the forward end portion of the second float assembly, such that the first linkage may articulate between lower and upper positions;

a second linkage having a first end portion operatively, pivotably coupled with the support frame and a second end portion operatively, pivotably coupled with the rearward end of the second float assembly, such that the second linkage may articulate between lower and upper positions;

wherein the forward end portion and rearward end portion of the second float assembly are positioned adjacent the support frame when the first linkage and second linkage are in the lower position and the forward end portion and rearward end portion of the second float assembly are positioned above and spaced apart from the support frame when the first linkage and second linkage are in the upper position;

the float assembly and second float assembly being laterally spaced from one another across a width of the support frame;

the second linkage of the float assembly and second float assembly each includes an upper arm and lower arm that are coupled with one another at an articulating joint intermediate the first and second end portions of the second linkages that allows a distance between the first and second end portions to change as the upper and lower arms pivot with respect to one another at the articulating joint;

the second linkage of the float assembly and second float assembly is longer than the first linkage of the float assembly and second float assembly, such that the rearward ends of the float assembly and second float assembly are spaced further away from the boat support than the forward ends of the float assembly and second float assembly when the first linkages and second linkages are in the upper position.

7. The guide system of claim 6 wherein:

the boat support is a boat trailer; and the rearward ends of the float assembly and second float assembly are positioned adjacent a rearward end of the boat trailer.

8. A guide system for a boat support, having a support frame, the guide system comprising:

a float assembly having a forward end portion and a rearward end portion;

a first linkage having a first end portion operatively, pivotably coupled with the support frame and a second end portion operatively, pivotably coupled with the forward end portion of the float assembly, such that the first linkage may articulate between lower and upper positions;

a second linkage having a first end portion operatively, pivotably coupled with the support frame and a second end portion operatively, pivotably coupled with the rearward end of the float assembly, such that the second linkage may articulate between lower and upper positions;

wherein the forward end portion and rearward end portion of the float assembly are positioned adjacent the support frame when the first linkage and second linkage are in the lower position and the forward end portion and rearward end portion of the float assembly are positioned above and spaced apart from the support frame when the first linkage and second linkage are in the upper position;

a second float assembly having a forward end portion and a rearward end portion;

a first linkage having a first end portion operatively, pivotably coupled with the support frame and a second end portion operatively, pivotably coupled with the forward end portion of the second float assembly, such that the first linkage may articulate between lower and upper positions;

a second linkage having a first end portion operatively, pivotably coupled with the support frame and a second end portion operatively, pivotably coupled with the rearward end of the second float assembly, such that the second linkage may articulate between lower and upper positions;

wherein the forward end portion and rearward end portion of the second float assembly are positioned adjacent the support frame when the first linkage and second linkage are in the lower position and the forward end portion and rearward end portion of the second float assembly are positioned above and spaced apart from the support frame when the first linkage and second linkage are in the upper position;

the float assembly and second float assembly being laterally spaced from one another across a width of the support frame; and a pair of first and second guide panels operatively coupled with, and extending upwardly from, an entrance end of the boat support; the rearward end portions of the float assembly and second float assembly being positioned between and adjacent the first guide panel and second guide panel along a width of the boat support.

9. A guide system for a boat support, having a support frame, the guide system comprising:

a first float assembly having a forward end portion and a rearward end portion; and a second float assembly having a forward end portion and a rearward end portion;

the first float assembly and second float assembly being operatively coupled with the support frame and movable between a lower position adjacent the support frame and an upper position wherein the forward end portions and rearward end portions of the first float assembly and second float assembly are positioned above, and spaced apart from, the support frame;

the first float assembly and second float assembly move between the lower and upper positions independently from one another.

10. The guide system of claim 9 wherein:

the first float assembly and second float assembly are elongated in shape and lengths of the float assembly and second float assembly extend generally parallel with one another.

11. The guide system of claim 9 further comprising:

a first linkage having a first end portion operatively, pivotably coupled with the support frame and a second end portion operatively, pivotably coupled with the first float assembly, such that the first linkage may articulate between lower and upper positions; and a second linkage having a first end portion operatively, pivotably coupled with the support frame and a second end portion operatively, pivotably coupled with the second float assembly, such that the second linkage may articulate between lower and upper positions.

12. In combination:

a marine vessel having elongate pontoons along sides of the marine vessel;

a boat support, having a support frame; and a guide system including:

a first float assembly having a forward end portion and a rearward end portion;

a first linkage and second linkage, each having a first end portion operatively, pivotably coupled with the support frame and a second end portion operatively, pivotably coupled with the first float assembly;

a second float assembly having a forward end portion and a rearward end portion;

a first linkage and second linkage, each having a first end portion operatively, pivotably coupled with the support frame and a second end portion operatively, pivotably coupled with the second float assembly;

the first float assembly and second float assembly being operatively coupled with the support frame and movable between a lower position adjacent the support frame and an upper position wherein the forward end portions and rearward end portions of the first float assembly and second float assembly are positioned above, and spaced apart from, the support frame;

the second linkage of the first float assembly and second float assembly each includes an upper arm and lower arm that are coupled with one another at an articulating joint intermediate the first and second end portions of the second linkages that allows a distance between the first and second end portions to change as the upper and lower arms pivot with respect to one another at the articulating joint;

the second linkage of the first float assembly and second float assembly is longer than the first linkage of the first float assembly and second float assembly, such that the rearward ends of the first float assembly and second float assembly are spaced further away from the boat support than the forward ends of the first float assembly and second float assembly when the first linkages and second linkages are in the upper position.

13. The combination of claim 12 wherein:

the first float assembly and second float assembly are elongated in shape and lengths of the float assembly and second float assembly extend generally parallel with one another and between the pontoons of the marine vessel when the marine vessel is secured on the boat support.

14. The combination of claim 12 wherein:

the boat support is a boat trailer; and the rearward ends of the first float assembly and second float assembly are positioned adjacent a rearward end of the boat trailer.

* * * * *